Figure 1:
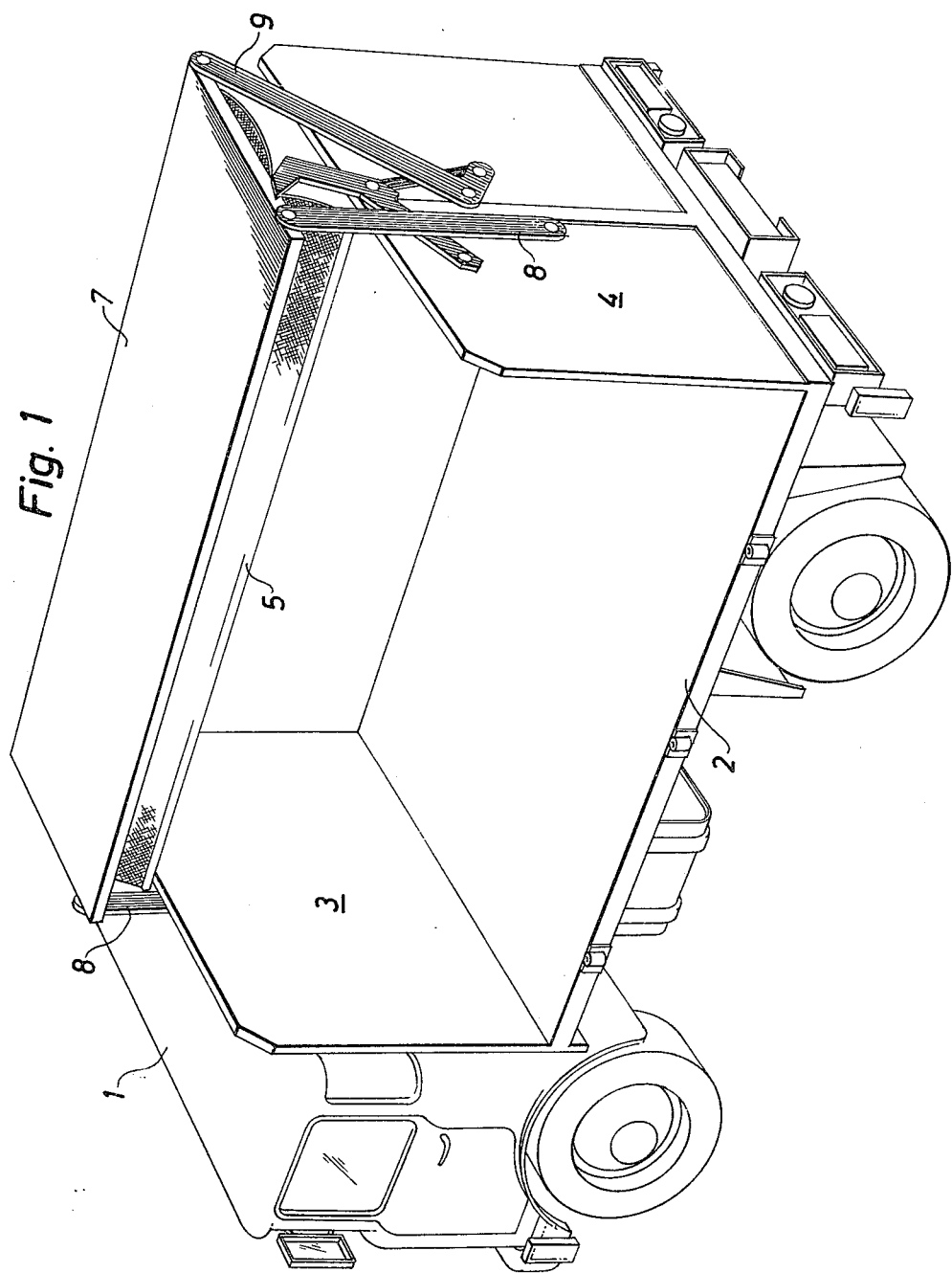

United States Patent [19]

Fredin

[11] 4,140,339
[45] Feb. 20, 1979

[54] DEVICE FOR COVERED TRUCKS AND TRAILERS

[76] Inventor: Bror T. Fredin, Västansjö, 820 62 Bjuråker, Sweden

[21] Appl. No.: 877,950

[22] Filed: Feb. 15, 1978

[30] Foreign Application Priority Data

Feb. 23, 1977 [SE] Sweden ............................ 7702024

[51] Int. Cl.² ............................................. B60P 7/04
[52] U.S. Cl. .................................. 296/100; 296/137 B
[58] Field of Search ............... 296/137 B, 137 C, 100; 160/188

[56] References Cited

U.S. PATENT DOCUMENTS

| | | | |
|---|---|---|---|
| 3,071,184 | 1/1963 | Peel | 160/188 X |
| 3,190,637 | 6/1965 | Kummerman | 160/188 X |
| 3,220,466 | 11/1965 | Kummerman | 160/188 |
| 3,549,199 | 12/1970 | Sibley | 296/100 |
| 4,050,734 | 9/1977 | Richard | 296/100 X |
| 4,060,273 | 11/1977 | Neville | 296/100 |

Primary Examiner—Joseph F. Peters, Jr.
Assistant Examiner—Norman L. Stack
Attorney, Agent, or Firm—Witherspoon, Lane & Hargest

[57] ABSTRACT

Device for covering loading platforms having two opposite raised front and rear members, at least one raised side member which may be swung from a position close to the loading platform to a position above the upper edge of the raised front and rear members and considerably inside the edge of the platform from which the raised side member being swung, a covering which is fastened to the raised side member as well as to or adjacent to the middle of the upper end faces of the raised front and rear members, a motor for swinging the raised member and upper and lower swinging arms the outer ends of which are pivotally attached to the end faces of the raised side member and the inner ends of which are pivotally attached to the respective front and rear member. A swinging arm being arranged adjacent to the upper edge of the respective front and rear member the free end of which arm in one terminal position is situated at the upper corner of the respective front and rear member and in the other terminal position is situated substantially above the middle of the upper end faces of the front and rear members. A linkage arm transmits the swinging movement from one of said upper and lower swinging arms to the swinging arm arranged at the upper edge of the respective front and rear member.

3 Claims, 4 Drawing Figures

DEVICE FOR COVERED TRUCKS AND TRAILERS

The present invention relates to trucks and especially to trucks with covered loading platforms.

Fragile piece goods that are transported by trucks and trailers, require proper covering in order not to be damaged by rain, snow, road dust or other pollution. For this purpose many kinds of structures covering the loading platform have been used. Such superstructures are not only expensive to manufacture but do also in an expensive way obstruct the loading and unloading of the truck. Finally such superstructures restrict the range of application for the truck.

A simpler method has been to stretch a canvas covering over and above the loading platform by means of sticks made by i.a. tubes. However, these sticks have either been in the way for loading and unloading or have involved the effort of taking them away and putting them back again. As far as loading and unloading of piece goods is concerned it is nowadays desirable that such operations should be carried out as quickly as possible with the least possible demand for manpower and in the easiest possible way. For the loading of i.a. bales of paper or pulp, pile trucks or similar are used which lift the goods onto the loading platform of the truck. Since such piler trucks cannot lift the goods far onto the platform the loading is carried out from the long side of the loading platform.

In order to overcome these problems a special construction has been developed which lifts up the raised side member of the loading platform while the canvas covering at the same time is moved clear away. Thus the whole side between the platform and the top of the covering structure is uncovered. The top of the covering structure is then delimited by a beam which extends from the front end member to the back end member of the loading platform. It has however, become obvious that the loading trucks often hit this outer top-beam and damage the same. If this happens it may become difficult to return the raised side member to its position at the platform and the covering may not be sufficient. Moreover such damages are expensive to repair considering the immediate costs of repair and the stand still costs for the truck or trailer. Since the platform is completely covered by the covering structure it is not possible to load and/or unload by means of a crane and consequently all such operations must be carried out from the side of the platform.

Accordingly one of the subjects of present invention is to overcome the disadvantages of the previously known constructions. This object is achieved with a device according to the claims, from which the essential characteristics of the invention are clear.

Figure 2:
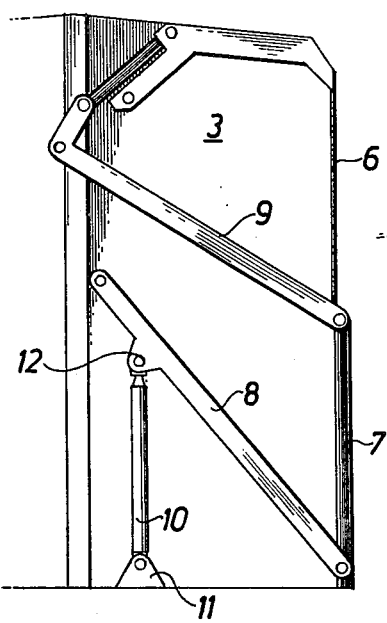
Figure 3:
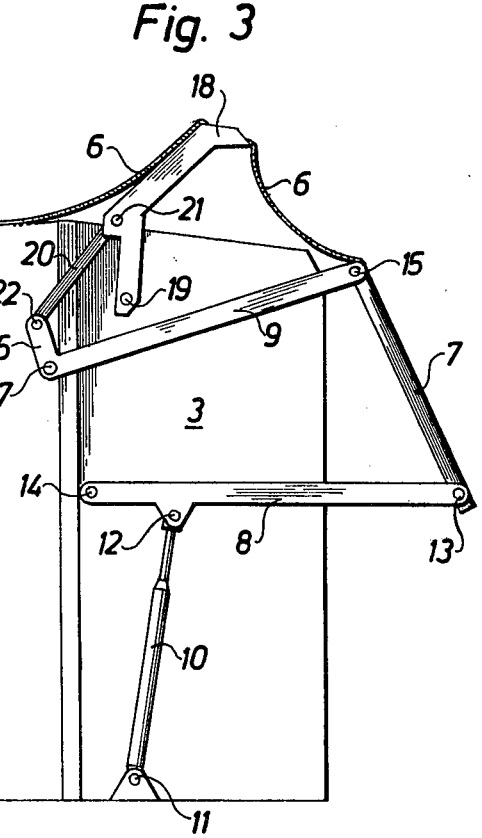
Figure 4:
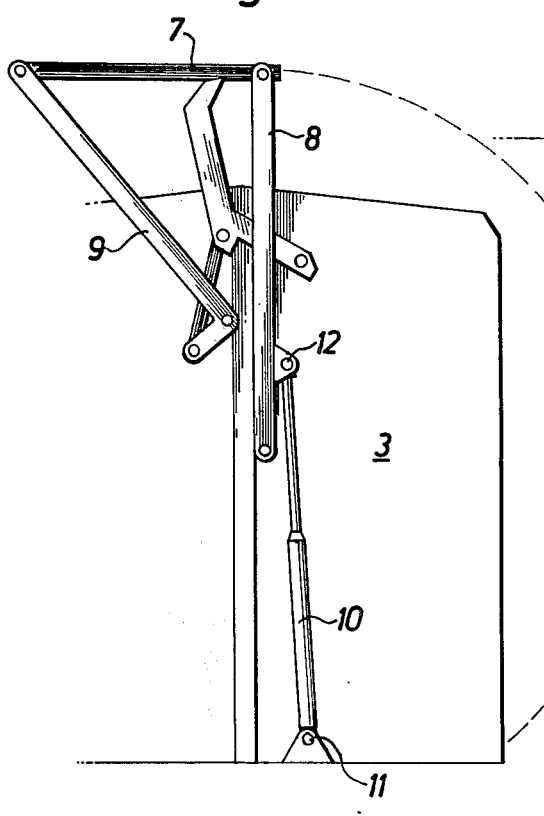

The invention is more clearly described in the following and in connection to the attached drawings, in which:

FIG. 1 is a perspective view of a covering structure for a loading platform according to the present invention, mounted on a truck, FIG. 2 schematically illustrates a raised end member, with the adherent linkage assembly for the covering structure in FIG. 1, in the position where the loading platform is completely covered, FIG. 3 is a view similar to FIG. 2 but with the linkage assembly in a position where the loading platform is being uncovered, and FIG. 4 is a view corresponding to FIGS. 2 and 3 but with the linkage assembly in the position where the loading platform is completely uncovered.

FIG. 1 illustrates a conventional truck 1 having a loading platform 2, provided with a raised front member 3 and a raised rear member 4. These raised members 3 and 4 are in all essentials alike but are reversed in relation to each other, they have the same width as the platform 2 and in height they extend above the driver's cab of the truck. At approximately their middle and at their upper edges the raised members 3 and 4 are preferably connected to each other by a beam 5.

A longitudinal raised side member 7 extends between the raised front and rear members 3 and 4 and has in the illustrated embodiment a height corresponding to half the height of the raised front and rear members 3 and 4 when the side member 7 is in its transport position, that is when its lower edge lies close to the platform 2. The side member 7 is suspended in arms 8, 9 which permit that the side member 7 is swung away when loading or unloading is to be carried out. The arms 8, 9 are pivotally attached both to the side member 7 and the front and rear members 3 and 4. A hydraulic cylinder 10 is arranged in connection to one of the arms in order to perform the swinging movement. So far the description relates to a conventional construction. As has been mentioned earlier the front and rear members with their respective levers and other equipment are alike but reversed. In this example the description only concerns one side of the loading platform, but it should be understood that if desired it may be possible to swing away both of the side members and both may be arranged in the same manner as by the side described here. Moreover the invention is not restricted to trucks but may also be used in connection with trailers, railway vans and similar where it is desirable to have a removable covering.

A tarpaulin or other similar protecting material in the shape of a covering 6 is fastened to the upper edge of the raised side member 7 and is extended along the full length of the loading platform 2. The covering 6 is also fastened to the beam 5, which connects the front and rear members 3 and 4. Thus when the side member 7 is swung upwardly the covering is pulled away and the long side of the loading platform 2 is uncovered for loading and unloading. Then when the side member 7 is swung back to the transport position the covering is stretched over the platform again and the driver does not have to take any further measures before the truck may be driven.

By previously known constructions a beam has been extended between the opposite front and rear members 3 and 4 at their outer corners, whereby the covering 6 either has been attached to this beam or has been supported by said beam in order not to fall in towards the goods on the loading platform. However, this beam has been in the way when it has been desirable to load the truck by means of a crane and it has often been damaged by the frame on piler trucks.

According to the present invention the raised side member 7 is pivotally attached to a pair of arms, a lower arm 8 and an upper arm 9. A hydraulic cylinder 10 is arranged in connection to the lower arm 8 in order to bring about the swinging movement of said arm 8. One end of the hydraulic cylinder 10 is fastened to the lower part of the raised front member 3 by means of a pivot pin 11 and its other end is connected to the arm 8 also by means of a pivot pin 12.

One end of the arm 8 is pivotally connected to the lower part of the end face of the side member 7 by means of a pin 13 and the other end is pivotally attached to the front member 3 by means of a pin 14, whereby the pin 14 is positioned slightly above the middle of the front member 3 and in direction towards the side member 7 slightly displaced from an imaginary vertical centre line through the front member 3.

The upper arm 9 has one end pivotally attached to the upper part of the end face of the side member 7 by means of a pin 15. The other, inner end of the upper arm 9 is shaped with an angular arm 16 which makes an angle of approximately 90° with the arm 9 and which in general is extended upwardly. The arm 9 is pivotally attached to the front member 3 by means of a pin 17 which is placed in the exact spot where the arms 9 and 16 make an angle with each other, and accordingly the pin 17 is placed approximately half-way between the pin 14 and the upper edge of the front member 3 and in a direction from the side member 7, slightly displaced from the imaginary vertical centre line through the front member 3.

An arm 18 is pivotally attached to the front member 3 by means of a pin 19 which is placed slightly above the angular arm 16 and a short distance away from this in direction towards the side edge of the front member 3. The arm 18 consists of two in relation to each other angular parts, of which one, in transport position, that is when the platform is covered, is parallel to the upper edge of the front member 3 and terminates at the side edge of said member 3, and of which the other substantially extends from the inner end of the first part of the pivot pin 19.

A linkage arm 20 is pivotally attached to the arm 18 through a pivot pin 21, which is placed approximately where the two parts of the arm 18 join, as well as to the angular arm 16 by means of a pin 22.

A beam (not shown) extends along the full length of the loading platform 2, between the outer ends of two opposite arms 18. This beam rests in sockets at the upper, outer corners of the front and rear members 3 and 4 when the platform is covered and the side member 7 is in its transport position. The covering 6 may be fastened to said (not shown) beam but this is not necessary.

The invention operates in the following manner: when the truck is ready to drive the covering 6 and the raised side member or members 7 are in a position according to FIG. 2. The covering 6 is stretched from the beam 5, over the not shown beam, between the outer ends of the arms 18, and to the upper edge of the side member 7. The covering is slightly wider than the loading platform 2 is long so that it will be properly stretched over the outer edges of the front and rear members 3 and 4.

When the covering as well as the side member 7 are to be moved away in order to permit loading and unloading, hydraulic pressure is applied to the cylinder 10. Consequently the piston rod will move out from the cylinder 10 and will in its turn swing the arm 8 upwardly. Due to the connections between the different arms the side member as well as the arm 9 will be swung outwardly whereby the angular arm 16 applies a pulling force to the arm 20 which in turn results in that the arm 18 is swung upwardly. Accordingly the covering 6 is moved clear away as illustrated in FIG. 3.

When the piston rod has moved as far as out from the hydraulic cylinder 10 as possible the arms have reached the position illustrated in FIGS. 1 and 4. At this stage the side member 7 is swung up to a position where it is situated over the half of the loading platform 2 that is opposite the half from which the side member 7 is swung up. The covering 6 is fully withdrawn and substantially half of the platform 2 is available for loading from above.

No beams obstruct the loading manoeuvers of the piling trucks. When the loading or unloading has been carried out the application of hydraulic pressure to the cylinder 10 is reversed so that the piston rod is brought back into the cylinder, whereby the side member 7 is swung back to a position close to the edge of the platform 2 and the covering 6 is simultaneously stretched. After that the truck is ready to drive.

I claim:

1. Device for covering loading platforms having two opposite raised front and rear members (3, 4), at least one raised side member (7), which may be swung from a position close to the loading platform (2) to a position above the upper edge of the raised front and rear members (3, 4) and considerably inside the edge of the platform from which the raised side member (7) is being swung, a covering (6) which is fastened to the raised side member (7) as well as to or adjacent to the middle of the upper end faces of the raised front and rear members (3, 4), motor (10) for swinging the raised side member (7), and upper and lower swinging arms (8, 9) the outer ends of which are pivotally attached to the end faces of the raised side member (7) and the inner ends of which are pivotally attached to the respective front and rear member (3, 4), characterized by a swinging arm (18) adjacent to the upper edge of the respective front and rear member (3, 4) the free end of which arm (18) in one terminal position is situated at the upper corner of the respective front and rear member (3, 4) and in the other terminal position is situated substantially above the middle of the upper end faces of the front and rear members (3, 4), and by a linkage arm (20) which transmits the swinging movement from one of said upper and lower swinging arms (8, 9) to the swinging arm (18) arranged at the upper edge of the respective front and rear member (3, 4).

2. Device according to claim 1, characterized in that two opposite swinging arms (18), arranged at the upper end faces of the raised front and rear members (3, 4) at their outer ends are connected to each other by a beam.

3. Device according to claim 2, characterized in that the covering (6) is fastened to said beam.

* * * * *